United States Patent
Andrews et al.

(10) Patent No.: US 7,487,235 B2
(45) Date of Patent: Feb. 3, 2009

(54) DYNAMICALLY VARYING A RAID CACHE POLICY IN ORDER TO OPTIMIZE THROUGHPUT

(75) Inventors: Carlton A. Andrews, Austin, TX (US); Thomas Vrhel, Jr., Woodinville, WA (US)

(73) Assignee: Dell Products L.P., Round Rock, TX (US)

( * ) Notice: Subject to any disclaimer, the term of this patent is extended or adjusted under 35 U.S.C. 154(b) by 694 days.

(21) Appl. No.: 10/669,870

(22) Filed: Sep. 24, 2003

(65) Prior Publication Data

US 2005/0076115 A1 Apr. 7, 2005

(51) Int. Cl.
G06F 15/173 (2006.01)
G06F 12/00 (2006.01)
G06F 17/30 (2006.01)

(52) U.S. Cl. .................. 709/223; 709/224; 709/226; 707/200; 711/114; 711/118

(58) Field of Classification Search .............. 709/226, 709/223, 224; 707/200; 711/114, 118
See application file for complete search history.

(56) References Cited

U.S. PATENT DOCUMENTS

| | | | | |
|---|---|---|---|---|
| 5,809,224 A | 9/1998 | Schultz et al. | | 395/182.05 |
| 5,815,648 A | 9/1998 | Giovannetti | | 395/182.03 |
| 5,884,055 A | 3/1999 | Tung et al. | | 395/307 |
| 5,890,207 A | 3/1999 | Sne et al. | | 711/113 |
| 5,890,219 A | 3/1999 | Scaringella et al. | | 711/162 |
| 5,940,838 A | 8/1999 | Schmuck et al. | | 707/200 |
| 6,078,990 A | 6/2000 | Frazier | | 711/114 |
| 6,081,812 A | 6/2000 | Boggs et al. | | 707/202 |
| 6,098,119 A | 8/2000 | Surugucchi et al. | | 710/10 |
| 6,105,122 A | 8/2000 | Muller et al. | | 712/1 |
| 6,148,349 A | 11/2000 | Chow et al. | | 710/33 |
| 6,163,773 A * | 12/2000 | Kishi | | 706/16 |
| 6,247,077 B1 | 6/2001 | Muller et al. | | 710/74 |
| 6,256,740 B1 | 7/2001 | Muller et al. | | 713/201 |
| 6,260,108 B1 | 7/2001 | Barve et al. | | 711/112 |
| 6,301,640 B2 | 10/2001 | Barve et al. | | 711/113 |
| 6,336,138 B1 * | 1/2002 | Caswell et al. | | 709/223 |
| 6,519,679 B2 | 2/2003 | Devireddy et al. | | 711/114 |
| 6,542,964 B1 * | 4/2003 | Scharber | | 711/122 |
| 6,594,698 B1 | 7/2003 | Chow et al. | | 709/226 |
| 6,771,661 B1 * | 8/2004 | Chawla et al. | | 370/468 |
| 6,922,724 B1 * | 7/2005 | Freeman et al. | | 709/223 |
| 7,089,293 B2 * | 8/2006 | Grosner et al. | | 709/217 |
| 7,146,524 B2 * | 12/2006 | Patel et al. | | 714/6 |
| 2002/0049840 A1 * | 4/2002 | Squire et al. | | 709/225 |
| 2002/0095532 A1 * | 7/2002 | Surugucchi et al. | | 710/5 |
| 2002/0133669 A1 | 9/2002 | Devireddy et al. | | 711/114 |

* cited by examiner

Primary Examiner—John Follansbee
Assistant Examiner—Philip J Chea
(74) Attorney, Agent, or Firm—Baker Botts L.L.P.

(57) ABSTRACT

In an information handling system, an application operating on an elements of a the information handling system having one or more RAID systems is used to monitor the number of client devices and other operational aspects of the system. The application is constructed and arranged to determine and implement the best cache policy for the RAID systems in order to maximize the desired operational characteristics of the information handling system. The application can operate on a single server or RAID system device, or the application can operate on a separate device to control the cache policies of one or more servers.

25 Claims, 7 Drawing Sheets

DYNAMICALLY VARYING A RAID CACHE POLICY IN ORDER TO OPTIMIZE THROUGHPUT

BACKGROUND OF THE INVENTION TECHNOLOGY

1. Field of the Invention

The present invention is related to information handling systems, and more specifically, to optimizing the throughput of data by modifying RAID cache parameters based on real-time operating conditions.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems, e.g., computer, personal computer workstation, portable computer, computer server, print server, network router, network hub, network switch, storage area network disk array, RAID disk system and telecommunications switch.

RAID disk systems have been employed in the prior art to provide an inexpensive way to store information reliably. Typical RAID disk arrays are composed of one or more hard disks with some extra logic that dictates where the information is to be distributed among the hard disks. Generally, a given piece of information is distributed to two or more hard disks so that if one disk becomes inoperative, the given piece of information is available on a second or third hard disk. The chance that two or more hard disks will become inoperative simultaneously, while possible, is remote.

In order to perform the distribution during write operations (and consequently in many read operations), many RAID disk systems employ a caching procedure. The choice of cache procedure is often based on the preference of the manufacturer, or the user. The choice is often based on some particular network bandwidth bottleneck that is perceived by the network administrator. Other choices are simply set by the vendor and "hard coded" into the RAID controller.

Vendors often struggle with determining which of several cache options to offer their customers. Similarly, network administrators struggle to choose among the cache policies available. The choice of which cache policy has important ramifications for overall network performance. Poorly chosen cache policies can cause the RAID disk system to take longer to satisfy read and write operations imposed by network clients, leading to unnecessary network congestion and lower overall network system performance.

Therefore, a problem exists, and a solution is required for improving the operational performance of RAID arrays.

SUMMARY OF THE INVENTION

The present invention remedies the shortcomings of the prior art by providing a method, system and apparatus, in an information handling system, for monitoring a set of conditions, such as the number of connected clients on a network, their open files, and input/output ("I/O") requests. Based on the conditions, and previous measurements made for the same class of machine that supports the clients, the RAID cache parameters can be altered dynamically through, for example, the application programming interface ("API") that is provided by the vendor of the RAID controller. Calls to the API can be used to provide maximum disk throughput as clients request and release control of their files on the system.

Alternate embodiments of the present invention enable the monitoring of whether the client's files are actively requesting data from files that have been requested (by other clients) or have been released by other clients.

Yet another alternate embodiment of the present invention, a process on each server performs the monitoring functionality mentioned above. The server process measures the conditions of the network, and adjusts dynamically, the cache parameters of the server's RAID controller in order to maximize throughput of the mass storage devices associated with the server's RAID array.

Still another embodiment of the present invention utilizes a process on, for example, a load balancer, server, router, grid or cluster master to monitor the conditions of the network and adjust dynamically the cache parameters of the RAID arrays for one or more servers or other devices providing storage for the network.

Other technical advantages of the present disclosure will be readily apparent to one skilled in the art from the following figures, descriptions, and claims. Various embodiments of the invention obtain only a subset of the advantages set forth. No one advantage is critical to the invention.

BRIEF DESCRIPTION OF THE DRAWINGS

A more complete understanding of the present disclosure and advantages thereof may be acquired by referring to the following description taken in conjunction with the accompanying drawings wherein.

Figure 1:
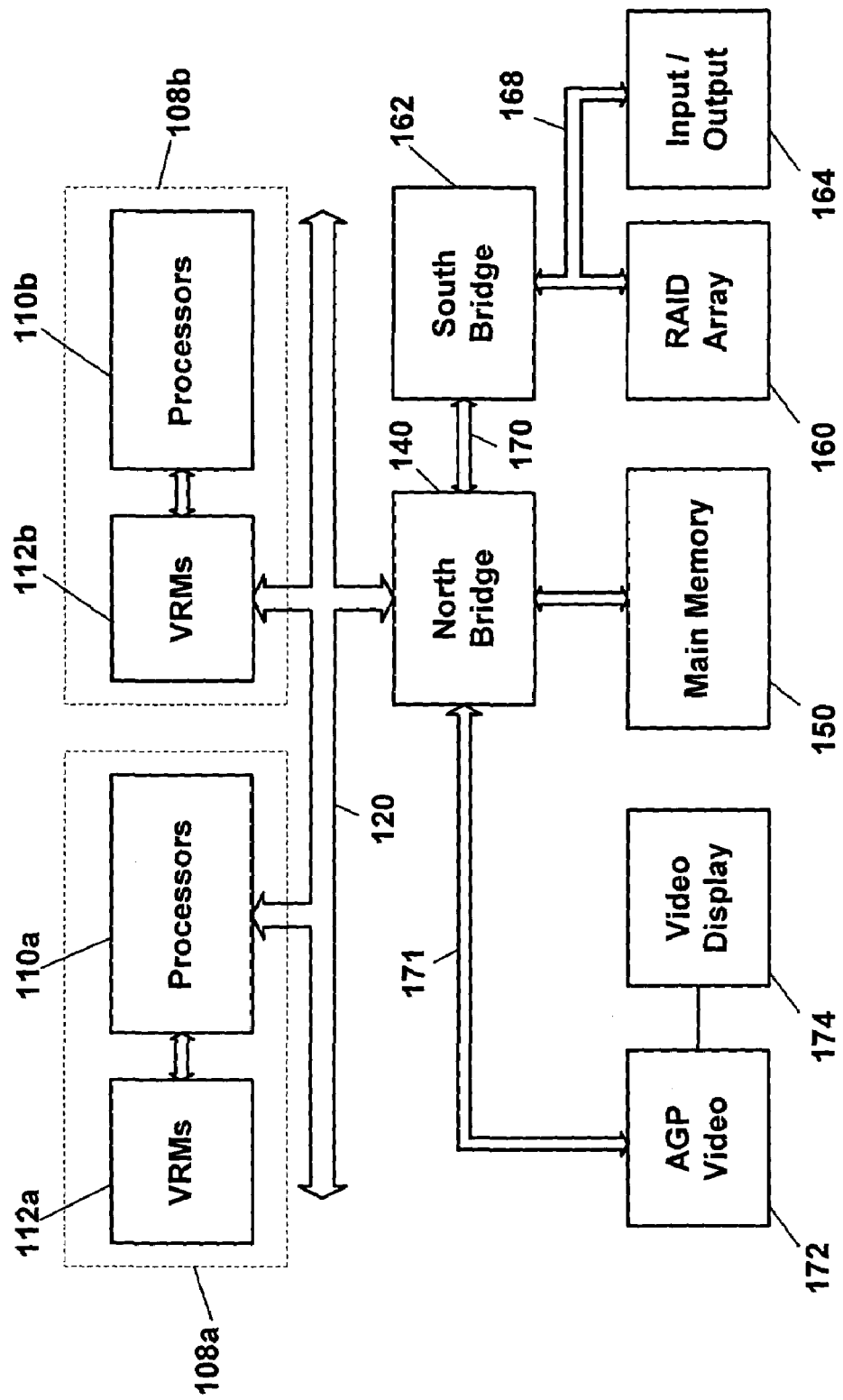
FIG. 1 is a schematic block diagram of an exemplary embodiment of an information handling system.

The present invention may be susceptible to various modifications and alternative forms. Specific exemplary embodiments thereof are shown by way of example in the drawing and are described herein in detail. It should be understood, however, that the description set forth herein of specific embodiments is not intended to limit the present invention to the particular forms disclosed. Rather, all modifications, alternatives, and equivalents falling within the spirit and scope of the invention as defined by the appended claims are intended to be covered.

DETAILED DESCRIPTION OF SPECIFIC EMBODIMENTS

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU), hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring now to the drawings, the details of an exemplary embodiment of the present invention are schematically illustrated. Like elements in the drawings will be represented by like numbers, and similar elements will be represented by like numbers with a different lower case letter suffix.

Referring to FIG. 1, depicted is an information handling system having electronic components mounted on at least one printed circuit board (PCB) (not shown) and communicating data and control signals there between over signal buses. In one embodiment, the information handling system is a computer system. The information handling system, generally referenced by the numeral 100, comprises processors 110 and associated voltage regulator modules (VRMs) 112 configured as a processor node 108. There may be one or more processor nodes 108 (two nodes 108a and 108b are illustrated). A north bridge 140, which may also be referred to as a "memory controller hub" or a "memory controller," is coupled to a main system memory 150. The north bridge 140 is coupled to the processors 110 via the host bus 120. The north bridge 140 is generally considered an application specific chip set that provides connectivity to various buses, and integrates other system functions such as memory interface. For example, an Intel 820E and/or 815E chip set, available from the Intel Corporation of Santa Clara, Calif., provides at least a portion of the north bridge 140. The chip set may also be packaged as an application specific integrated circuit ("ASIC"). The north bridge 140 typically includes functionality to couple the main system memory 150 to other devices within the information handling system 100. Thus, memory controller functions such as main memory control functions typically reside in the north bridge 140. In addition, the north bridge 140 provides bus control to handle transfers between the host bus 120 and one or more other buses, e.g., PCI bus 170 and AGP bus 171, the AGP bus 171 being coupled to video display 174. The second bus may also comprise other industry standard buses or proprietary buses, e.g., ISA, SCSI, USB buses 168 through a south bridge (bus interface) 162. These secondary buses 168 may have their own interfaces and controllers, e.g., RAID storage system 160 and input/output interface(s) 164. The RAID storage system 160 may contain one or more sub-components. For example, the RAID storage system 160 may contain one or more RAID controllers, and one or more disk drives (often called "arrays") that are operative with the RAID controller. Other RAID storage systems 160 may contain only one or more mass storage devices which are controlled (striped) by software operating within, for example, an operating system kernel such as LINUX® which is available on the Internet at kernel.org. Alternatively, the RAID controller may be in the form of hardware that is embedded within one or more chips on a motherboard, or on a peripheral card that is connected to the motherboard by, for example, a PCI connector. Other RAID controllers can use a combination of hardware and software.

Figure 7:
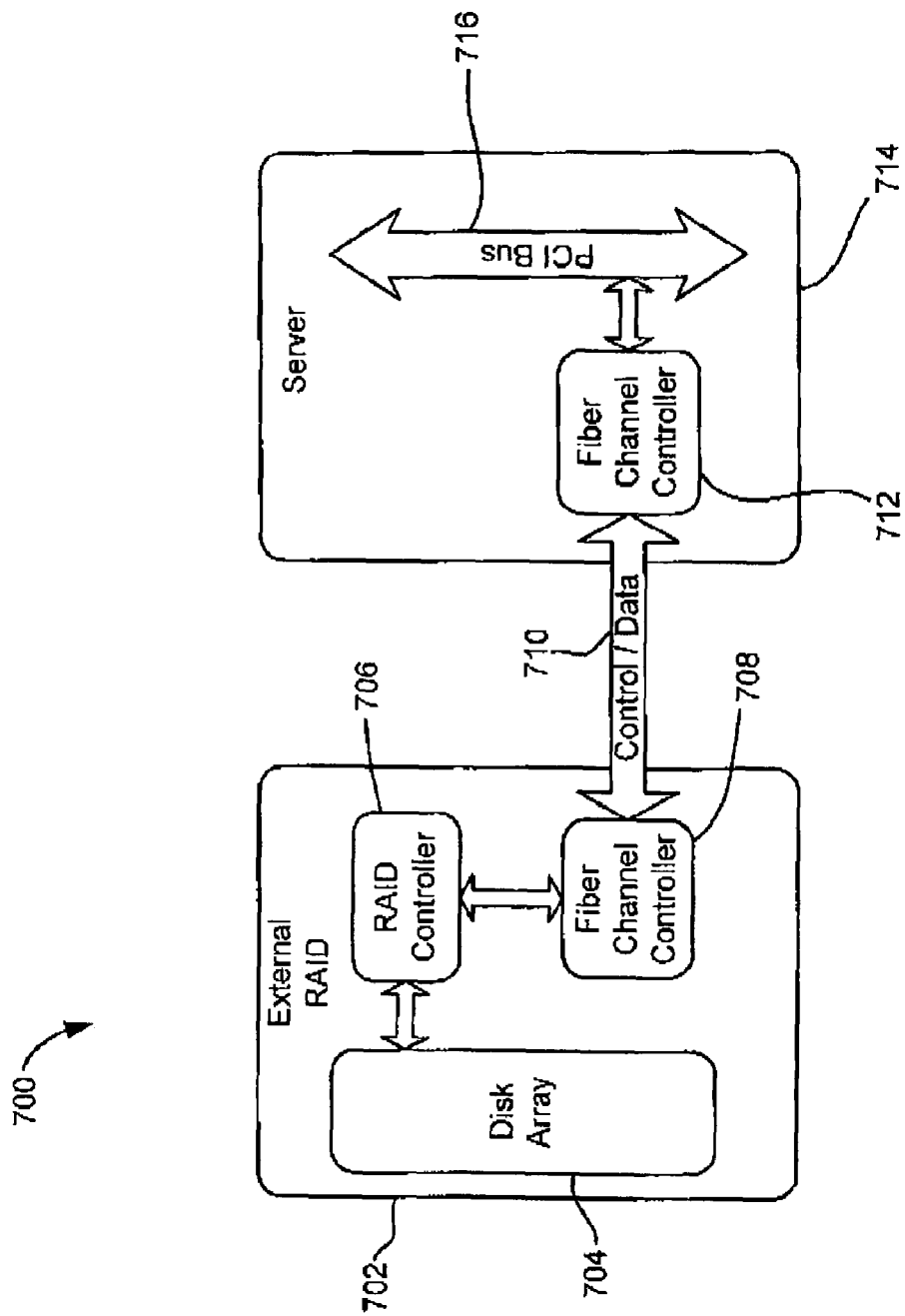
FIG. 7 is a block diagram of another exemplary embodiment of the present invention.

Alternate embodiments of the information handling system of the present invention provide a RAID system separate from the computers, servers and clients that it serves. Such a separate RAID system is illustrated in FIG. 7. In the illustrative example of FIG. 7, the information system 700 has two or more separate elements, namely the server 712 (which could also be a client workstation or other device) and the external RAID system 702. The external RAID system 702 typically has one or more disk arrays 704 that are controlled by a RAID controller 706. The RAID controller 706 is, in turn, operative with a high speed data transmission mechanism, such as fiber channel controller 708. The fiber channel controller 708 is connected to other similar devices, such as fiber channel controller 712 of the server 714 via the control data channel 710. Finally, the fiber channel controller 712 is connected to the internal input-output system of the device, such as PCI bus 716 of the server 714. Other information handling systems have different arrangements and combinations of internal and external elements are possible with the present invention.

RAID controllers, like the Dell PERC2 and the Dell PERC3, which are available from Dell Inc. of Round Rock, Tex., have specific functional settings that can be varied to obtain maximum performance for the type of operations the RAID array is most likely to perform. There are a variety of policies that cover different aspects of the RAID system, including the read cache, the write cache, and the input/output ("I/O").

The implications and interactions of the various policy combinations are sometimes difficult to discern. Moreover, depending upon the type of loading on the server, the most advantageous settings of these parameters may vary in real time. For example, write policy specifies the cache write policy. The operator can set the write policy to write-back or write-through. In write-back caching, the controller sends a data transfer completion signal to the host when the controller cache has received all the data in a transaction. However, the write-back setting is not recommended for various reasons. In write-through caching, the controller sends a data transfer completion signal to the host when the disk subsystem has received all the data in a transaction. This characteristic is desirable and thus write-through caching is the default setting for cluster mode. Moreover, write-through caching has a data security advantage over write-back caching, whereas write-back caching has a performance advantage over write-through caching. Read-ahead enables the SCSI read-ahead feature for the logical drive. The user can set this parameter to No-Read-Ahead (No-Ahead), Read-ahead, or Adaptive. Adaptive is typically the default setting. No-Read-Ahead specifies that the controller does not use read-ahead for the current logical drive. Read-ahead specifies that the controller uses read-ahead for the current logical drive. Adaptive specifies that the controller begins using read-ahead if the two most recent disk accesses occurred in sequential sectors. If all read requests are random, the algorithm reverts to No-Read-Ahead, however, all requests are still evaluated for possible sequential operation.

Cache policy applies to reads on a specific logical drive. It does not affect the Read-ahead cache. Cached I/O specifies that all reads are buffered in cache memory. Direct I/O specifies that reads are not buffered in cache memory. Direct I/O is the default setting for typical SCSI systems. Direct I/O does not override the cache policy settings. Data is transferred to cache and the host concurrently. If the same data block is read again, it comes from cache memory.

The overall performance of the RAID system is a function of the load on the system and the different policies determine characteristics such as write policy, read policy and whether the data is cached on the board or in system memory. Each of the policies can be mixed and matched among the policies of the other aspects (read cache-write cache-I/O) of the RAID element to form an overall RAID policy and hence performance for a given load. In the example given above, there are 12 combinations of RAID policies as shown in Table 1 below. Application of new or additional policies with the present invention would increase the number combinations possible. Each combination of policies has an affect on performance of the RAID system and thus on overall system performance. Consequently, the selection of the right combination of policies to maximize some system performance parameter is achievable with the present invention because it is flexible and can accommodate any range of policies and combinations of policies.

TABLE 1

Policy Combinations

| Read Cache | Write Cache | I/O |
|---|---|---|
| No-Ahead | Back | Cached |
| No-Ahead | Back | Direct |
| No-Ahead | Through | Cached |
| No-Ahead | Through | Direct |
| Adaptive | Back | Cached |
| Adaptive | Back | Direct |
| Adaptive | Through | Cached |
| Adaptive | Through | Direct |
| Read-Ahead | Back | Cached |
| Read-Ahead | Back | Direct |
| Read-Ahead | Through | Cached |
| Read-Ahead | Through | Direct |

Figure 2:
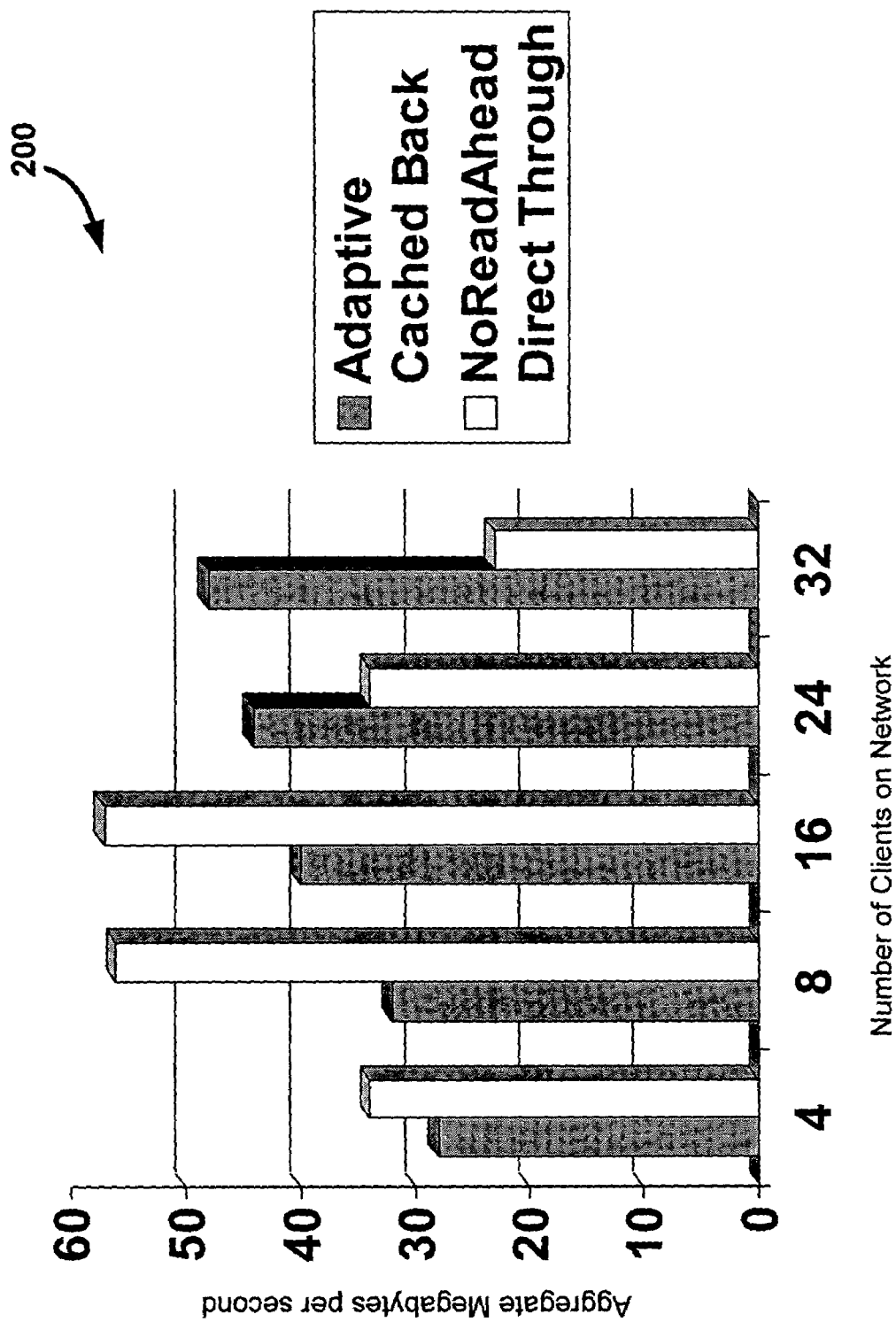
FIG. 2a is graph indicating the bandwidth affects of two different RAID settings for different numbers of clients.

An example of policy versus performance is shown in FIG. 2 in the form of a graph of number of clients versus aggregate megabytes per second, which show the relationship of read throughput of two server systems to the number of clients that are connected. The appropriate RAID cache parameter settings for ultimate performance varies depending on how many clients are making requests to the server for disk access. Thus the present invention provides the ability to independently control all of the available policy settings in order to optimize performance of the system (or an element within the system) for a perceived load on the system.

Figure 3:
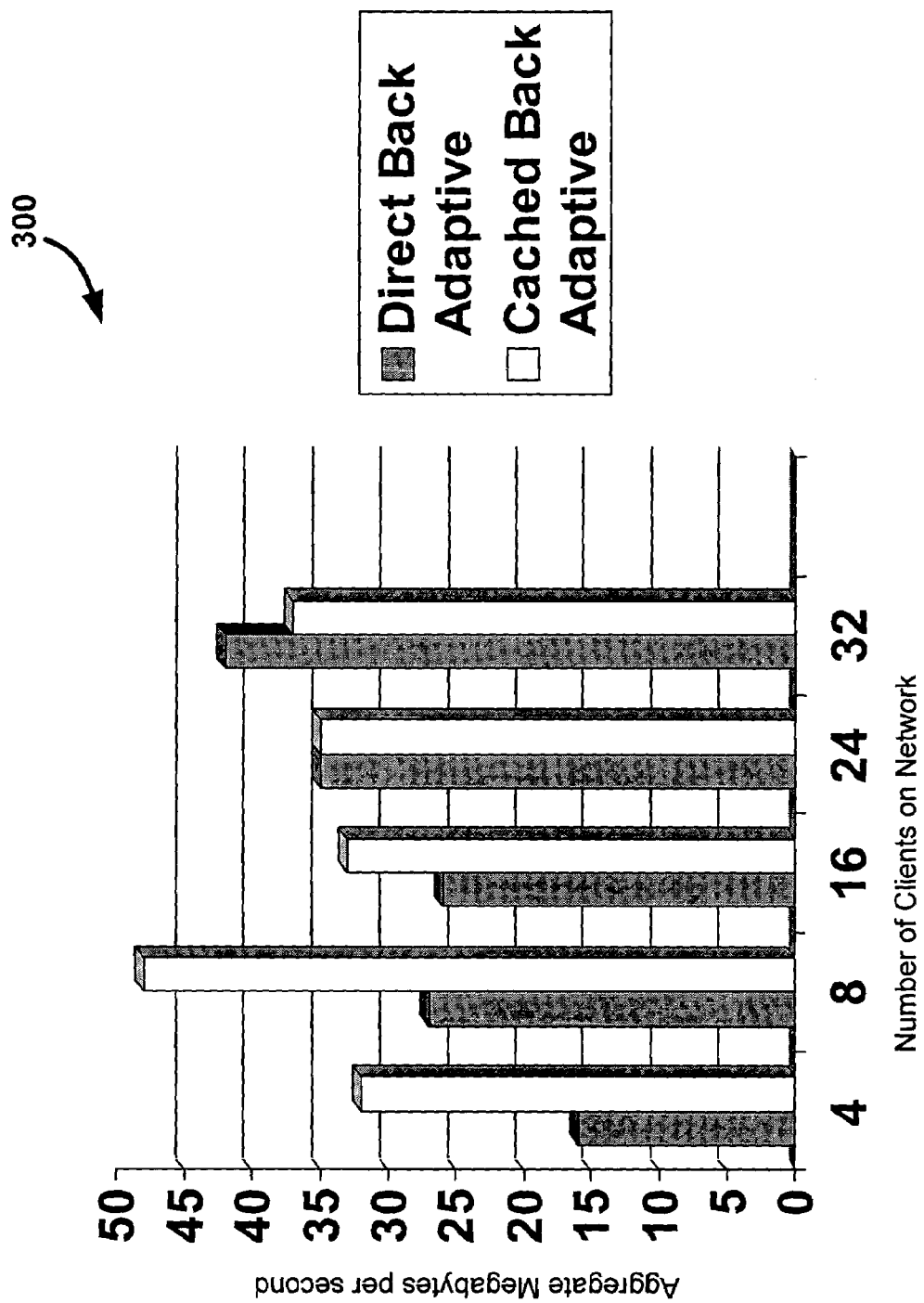
FIG. 3a is graph indicating the bandwidth affects of two different adaptive channels for different numbers of clients.

FIGS. 2 and 3 show the relationship of throughput of two DELL® server systems versus the number of clients connected for a variety of read and write cache policies. The DELL® servers are available from the Dell Inc. of Round Rock, Tex. As FIGS. 2 and 3 show, the appropriate RAID cache parameter settings for optimum performance varies depending on how many clients are making requests to the server for disk access and the type of cache policy chosen. In the case of FIG. 2, the two policies compared are the adaptive cached back policy, and the no read ahead direct through policy. In the case of FIG. 3, the two policies compared are the direct back adaptive policy and the cached back adaptive policy. Other policies can be used with equivalent effect with the present invention, and this specification should not be viewed as limiting in any way a particular cache policy or number of policy combinations. Indeed, other cache policies may be developed from time to time that further optimize a desired characteristic of the information handling system, such as bandwidth, speed, or the like. Selection of the desired optimizing characteristic (or set of characteristics) is often best determined in real time based upon the amount and character of the load on the servers. Server load can be assessed by, for example, the number of clients that are connected to the server by the network, and/or by the number of active files that are open and being read/written from/to by the clients on the network or other measures.

Statically setting these parameters means performance is compromised for servers where the number of connected clients varies. In the past, the cache policies were normally set in the controller BIOS prior to operating system boot up. In some instances, the cache policies are set by a GUI application executed under control of the operating system. In either case, the RAID settings are not dynamically altered under program control in real-time or near-real-time.

An application or service running on a server can monitor the number of connected clients, their open files and I/O request status. Based on these conditions and previous measurements made for the server class of machine, the RAID cache parameters can be dynamically altered through vendor API calls to provide maximum disk throughput as clients request and release control of files on the system. Moreover, the number of client files that are actively requesting data can also be monitored, and that data can be used to affect the cache policy that is employed on a dynamic basis.

Figure 4:
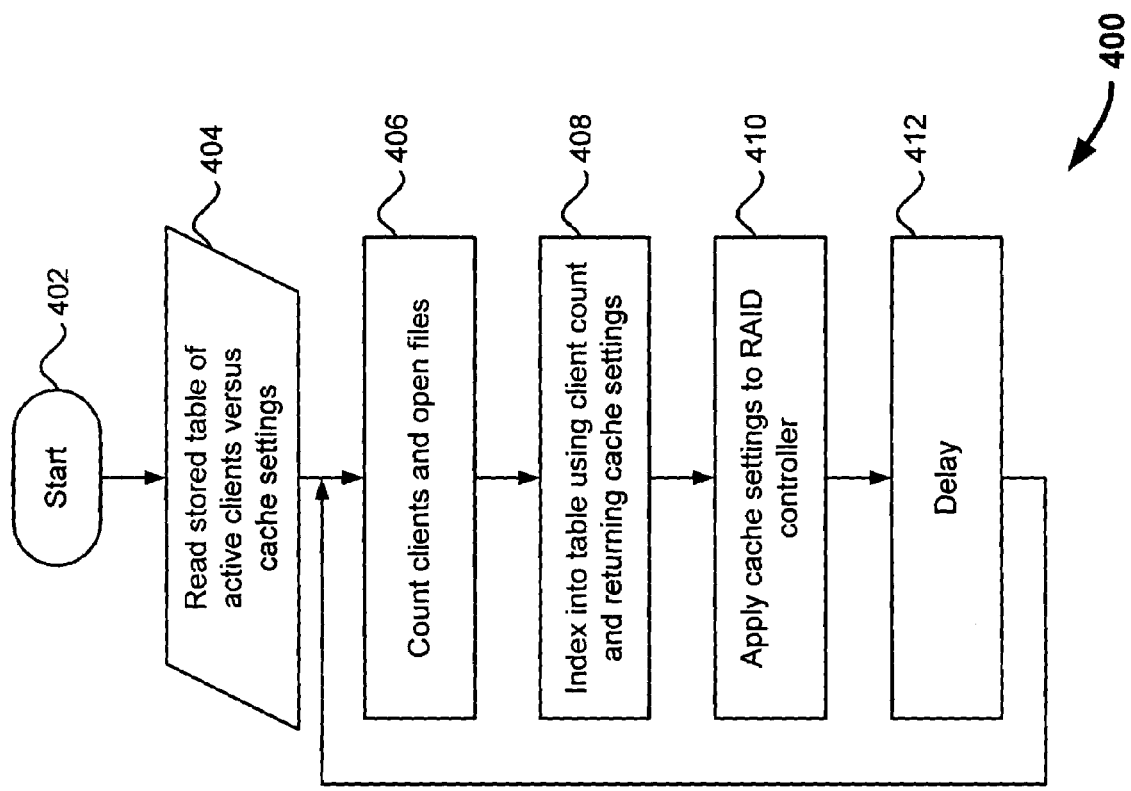
FIG. 4 is a flowchart illustrating an embodiment of the method of the present invention.

FIG. 4 illustrates a method for adapting, in a dynamic manner, the cache policy for the RAID array based upon monitored conditions of the network. Referring to FIG. 4, the method starts generally at step 402. Thereafter, in step 404, a table of stored information relating to the number of active clients versus the cache settings is read. Typically, the tables that are stored are based on experimental results by the vendor and/or network administrator based on representative conditions. In other words, tables of conditions such as those depicted in FIGS. 2 and 3 are stored can act as templates that are made available to the application process that monitors the network and sets the RAID cache policy. The stored tables/templates can act as a collective memory of experience that can be applied by the monitoring/directing process to select the best cache policy that maximizes network bandwidth and/or overall network system performance. Similarly, the monitoring/directing process could also use one or more algorithms that can predict the best cache policy to employ under any network condition. Finally, alternate embodiments of the method of the present invention can employ a combination of algorithms and table template reference can be used to set the cache policy in a dynamic manner.

Referring back to the embodiment depicted in FIG. 4, after the stored tables of network performance based on the number of clients and cache policy is read (in step 404), the load on the network is determined in step 406. The load on the network can be determined from one or more factors, such as the number of client devices in operation, the number of open files in use, etc. In step 408, the tables that were read (in step 404) are indexed according to the network load that was determined (in step 406) in order to determine the best cache policy that maximized desired performance. In alternate embodiments, the algorithm or algorithm/table combination would be accessed or indexed to provide the same selection of cache policy. The cache policy that was identified in step 408 is then applied to the one or more RAID disk systems in step 410. Thereafter, an optional delay may be implemented in step 412 to clear out the cache (employing the previous cache policy) or for other purposes. The method then repeats steps 406 through 412 as illustrated in FIG. 4 so that cache policies may be periodically or continuously updated.

Figure 5:
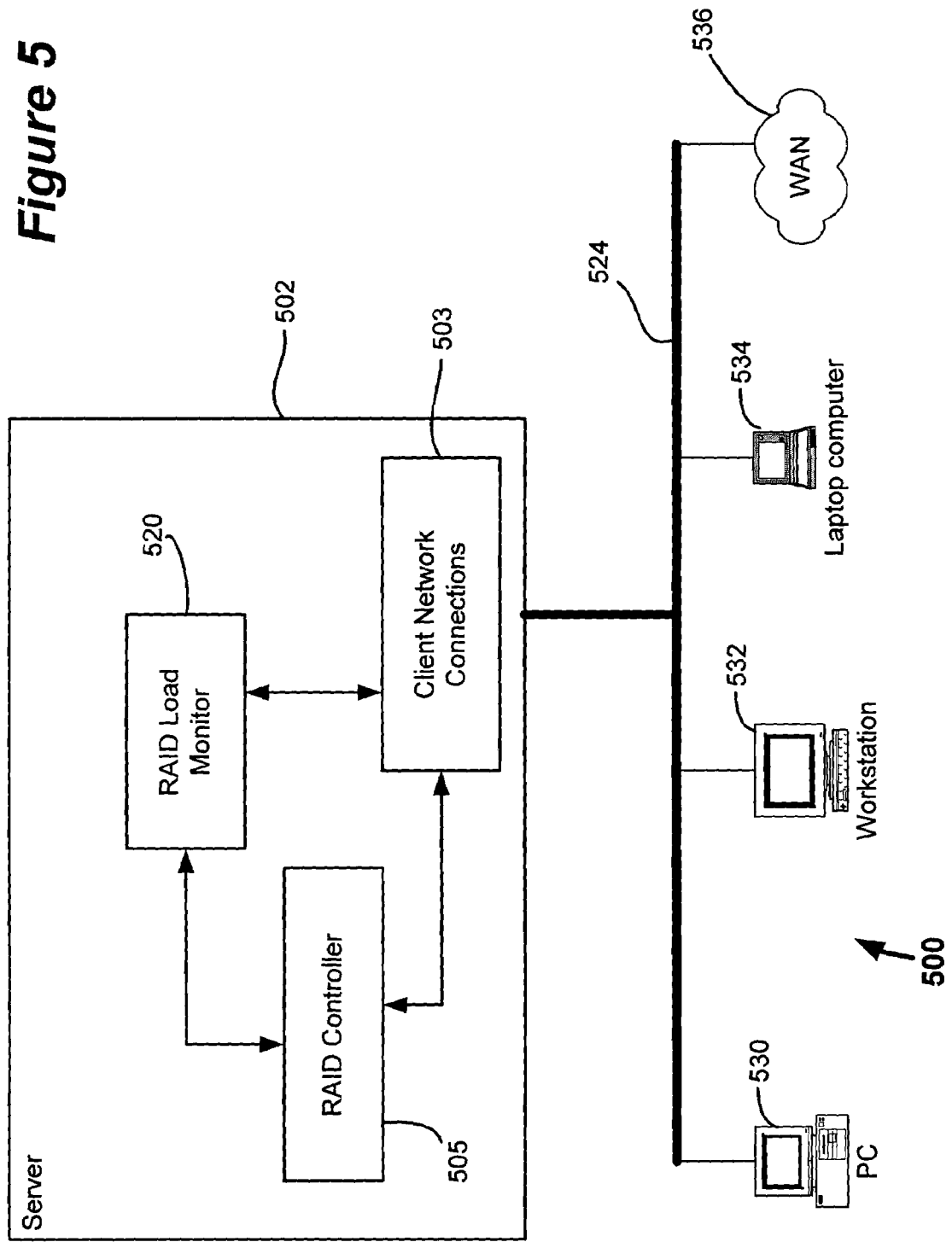
FIG. 5 is a block diagram illustrating an network of clients and servers that implement an embodiment of the present invention.

FIG. 5 illustrates a network 500 that implements an embodiment of the present invention. The network 500 employs a server 502 that services information to and from a number of clients, such as personal computer 530, workstation 532, laptop computer 534, and wide area network 536 along a network connectivity mechanism 524, such as an Ethernet link as illustrated in FIG. 5. Within the server 502, there are one or more client network connections 503, such as a network interface card. The server 502 is also equipped with a RAID controller 505 that controls one or more RAID elements, such as a hard disk or other mass storage device. The RAID load monitor 520 is operative with the client network connections 503 and the RAID controller 505 as illustrated in FIG. 5. The RAID load monitor 520 is constructed and arranged to implement the method of the present invention, such as the embodiment illustrated in FIG. 4. The RAID load monitor 520 can thus access one or more tables that are stored on the RAID system that is operative with the server 502 via, for example, the RAID controller 505. Similarly, the RAID load monitor 520 can determine the number of files open and clients attached via the RAID controller 505 and the client network connections element 503. The RAID load monitor is thus in a position to determine which cache policy best maximizes the desired performance characteristics of the network and can have that policy implemented by the RAID controller 505.

Figure 6:
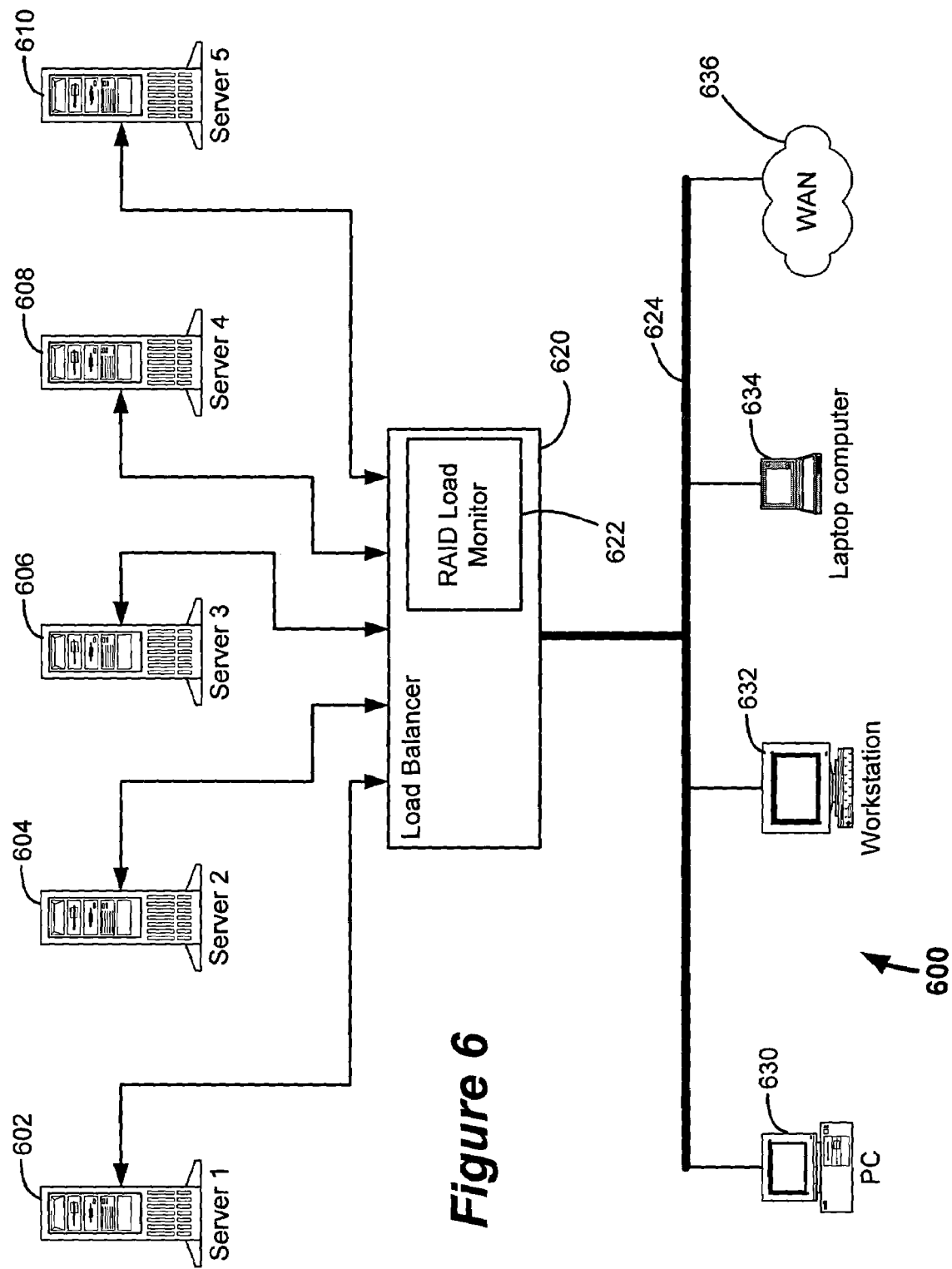
FIG. 6 is a block diagram of another exemplary embodiment of the present invention.

An alternate embodiment of the present invention is illustrated in FIG. 6. In this alternate embodiment, the clients 630 through 636 are serviced by a server farm that consists of multiple servers 602 through 610 as illustrated in FIG. 6. A load balancer 620 is used to distribute the load associated with the network 624 and clients 630 through 636. In this example, a load balancer 620 is used. However, other devices, such as a router, server, grid master, cluster master or other device could be substituted for the load balancer 620 with equivalent effect. The RAID load monitor 622 can be implemented on the load balancer 620 so that the RAID load monitor is in a position to monitor the number of clients serviced by the system 600, and to change the RAID cache policy used by the various servers 602 through 610 by implementing the method of the present invention as illustratively described in FIG. 4. The configuration of fig. 6 is further useful in that the RAID load monitor 622 can tailor the RAID cache policy for each of the individual servers 602 through 610 individually (or collectively) so that additional tailoring and optimization of the network 600 can be achieved.

The invention, therefore, is well adapted to carry out the objects and to attain the ends and advantages mentioned, as well as others inherent therein. While the invention has been depicted, described, and is defined by reference to exemplary embodiments of the invention, such references do not imply a limitation on the invention, and no such limitation is to be inferred. The invention is capable of considerable modification, alteration, and equivalents in form and function, as will occur to those ordinarily skilled in the pertinent arts and having the benefit of this disclosure. The depicted and described embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. An information handling system comprising:
a server, said server having one or more RAID systems, said RAID systems capable of implementing two or more cache policies, wherein at least one or said cache policies is an adaptive policy based on previous activity in the information handling system;
a network operative with said server, said network connection one or more clients to said server, said clients constructed and arranged to communicate with said server thereby placing a load on said server;
a load monitor operative with said one or more RAID systems, said load monitor constructed and arranged to monitor said load, said load monitor further constructed and arranged to select one or more cache policies of said one or more RAID systems that optimize a performance characteristic of said information handling system, wherein said load monitor monitors said load and implements a cache policy that optimizes said characteristic of said information handling system;
a storage accessible by said load monitor, wherein said storage comprises one or more tables of stored information accessible by said load monitor, wherein the stored information of each of the one or more tables relates to a total number of active clients and one or more cache settings;
wherein the one or more tables of stored information form one or more templates; and
wherein said load monitor employs the one or more templates and an algorithm to select said one or more cache policies.

2. The information handling system according to claim 1, wherein said RAID system has a read cache.

3. The information handling system according to claim 2, wherein said read cache has a no-ahead policy.

4. The information handling system according to claim 2, wherein said read cache has an adaptive policy.

5. The information handling system according to claim 2, wherein said read cache has a read-ahead policy.

6. The information handling system according to claim 1, wherein said RAID system has a write cache.

7. The information handling system according to claim 6, wherein said write cache has back policy.

8. The information handling system according to claim 6, wherein said write cache has through policy.

9. The information handling system according to claim 1, wherein said RAID system has an I/O.

10. The information handling system according to claim 9, wherein said I/O has a cached policy.

11. The information handling system according to claim 9, wherein said I/O has a direct policy.

12. The information handling system according to claim 1, wherein one of said cache policies is a no-ahead policy.

13. The information handling system according to claim 1, wherein one of said cache policies is a read-ahead policy.

14. The information handling system according to claim 1, wherein one of said cache policies is back policy.

15. The information handling system according to claim 1, wherein one of said cache policy is a through policy.

16. The information handling system according to claim 1, wherein said cache policy is a cached policy.

17. The information handling system according to claim 1, wherein said load monitor is a load balancer.

18. The information handling system according to claim 1, wherein said load monitor is a router.

19. The information handling system according to claim 1, wherein said load monitor is a server.

20. The information handling system according to claim 1, wherein said load monitor is a cluster master.

21. An information handling system comprising:
- at least one server, sand at least one server having one or more RAID systems,
- said RAID systems capable of implementing two or more cache policies, wherein at least one of said cache policies is an adaptive policy based on previous activity in the information handling system;
- a network operative with said server, said network connecting one or more clients to said server, said clients constructed and arranged to communicate with said server thereby placing a load on said server;
- a load balancer, said load balancer constructed and arranged to allocate said load among said one or more servers; and
- a load monitor operative on said load balancer, said load monitor constructed and arranged to monitor said load, said load monitor further constructed and arranged to select a cache policy of said one or more RAID systems on said one or more servers that optimize said performance characteristic of said information handling system, wherein said load monitor monitors said load and implements a cache policy that optimizes a characteristic of said information handling system;
- a storage accessible by said load monitor, wherein said storage comprises one or more tables of stored information accessible by said load monitor, wherein the stored information of each of the one or more tables relates to a total number of active clients and one or more cache settings;
- wherein the one or more tables of stored information form one or more templates; and
- wherein said load monitor employs the one or more templates and an algorithm to select said one or more cache policies.

22. The information handling system according to claim 21, wherein said load monitor is a load balancer.

23. The information handling system according to claim 21, wherein said load monitor is a router.

24. The information handling system according to claim 21, wherein said load monitor is a server.

25. The information handling system according to claim 21, wherein said load monitor is a cluster master.

* * * * *